US012608262B2

(12) United States Patent
Sayyed et al.

(10) Patent No.: US 12,608,262 B2
(45) Date of Patent: Apr. 21, 2026

(54) CRASH HANDLING IN A HETEROGENEOUS COMPUTING PLATFORM

(71) Applicant: Dell Products L.P., Round Rock, TX (US)

(72) Inventors: Ibrahim Sayyed, Georgetown, TX (US); Adolfo S. Montero, Pflugerville, TX (US); Alan H. Abdelhalim, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 18/625,300

(22) Filed: Apr. 3, 2024

(65) Prior Publication Data

US 2025/0315332 A1     Oct. 9, 2025

(51) Int. Cl.
| | |
|---|---|
| *G06F 11/00* | (2006.01) |
| *G06F 11/07* | (2006.01) |
| *G06F 11/14* | (2006.01) |

(52) U.S. Cl.
CPC ...... *G06F 11/0778* (2013.01); *G06F 11/0787* (2013.01); *G06F 11/1417* (2013.01)

(58) Field of Classification Search
None
See application file for complete search history.

(56) References Cited

U.S. PATENT DOCUMENTS

| | | | | |
|---|---|---|---|---|
| 9,021,312 | B1 * | 4/2015 | Saxena | G06F 11/366 |
| | | | | 714/38.1 |
| 2020/0034237 | A1 * | 1/2020 | Suryanarayand | G06F 11/073 |
| 2022/0414233 | A1 * | 12/2022 | Das | G06F 21/602 |

OTHER PUBLICATIONS

Google Scholar/Patents search—text refined (Year: 2025).*

* cited by examiner

*Primary Examiner* — Christopher S Mccarthy
(74) *Attorney, Agent, or Firm* — Fogarty LLP

(57) ABSTRACT

Systems and methods include an Information Handling System (IHS) that is adapted to provide crash handling that is particularized to each phase of the IHS boot sequence. A boot sequence is initiated that includes two or more phases. Prior to each phase of the boot sequence, a crash handler is initiated that is configured to collect state information for IHS hardware configured during that respective phase of the boot sequence. Upon detecting a boot sequence crash by the IHS, the crash handler operating during the phase of the boot sequence of the crash stores hardware state information it has collected to a shared memory location.

20 Claims, 5 Drawing Sheets

100

300

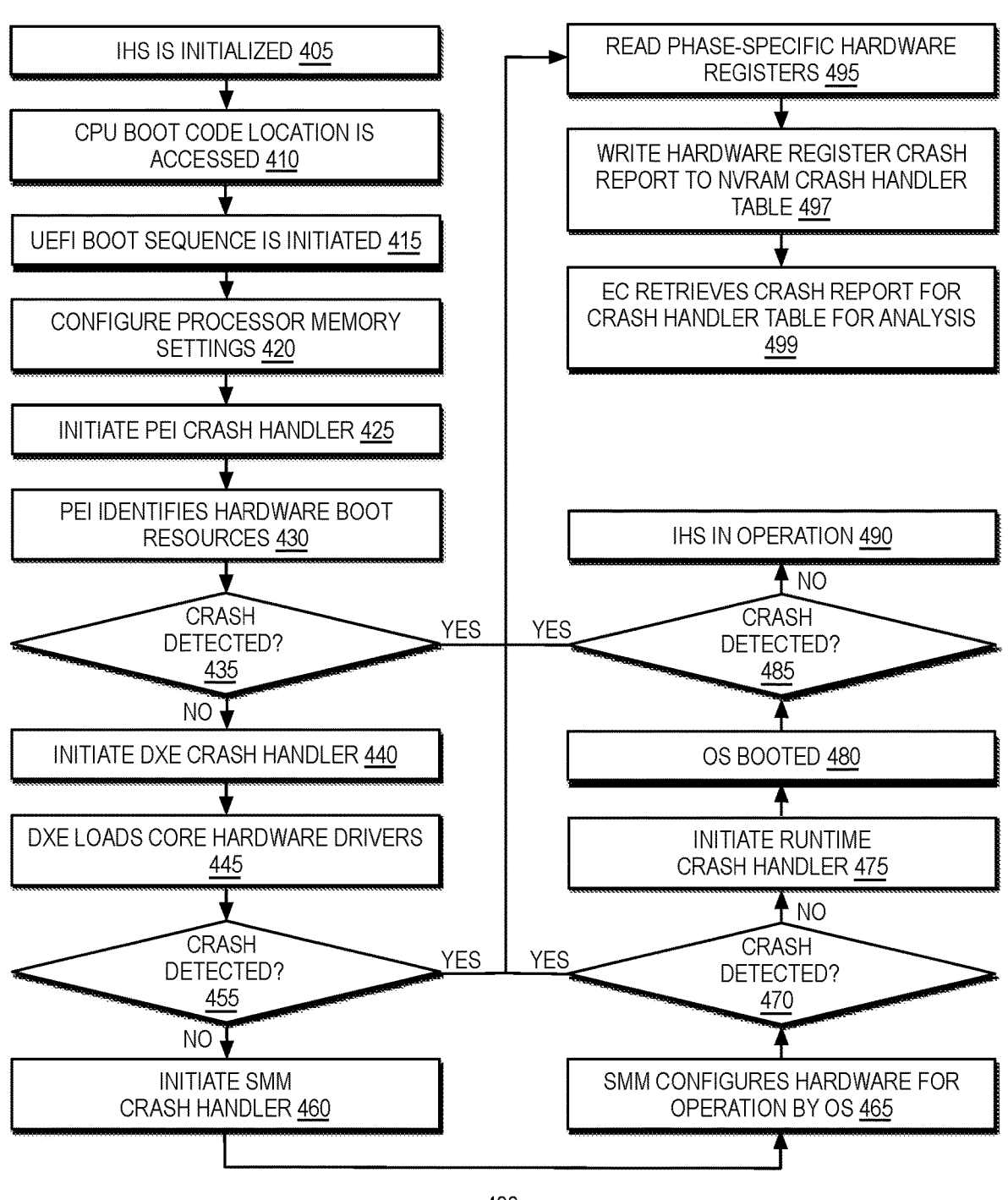

IHS IS INITIALIZED 405

CPU BOOT CODE LOCATION IS ACCESSED 410

UEFI BOOT SEQUENCE IS INITIATED 415

CONFIGURE PROCESSOR MEMORY SETTINGS 420

INITIATE PEI CRASH HANDLER 425

PEI IDENTIFIES HARDWARE BOOT RESOURCES 430

CRASH DETECTED? 435

NO

INITIATE DXE CRASH HANDLER 440

DXE LOADS CORE HARDWARE DRIVERS 445

CRASH DETECTED? 455

NO

INITIATE SMM CRASH HANDLER 460

READ PHASE-SPECIFIC HARDWARE REGISTERS 495

WRITE HARDWARE REGISTER CRASH REPORT TO NVRAM CRASH HANDLER TABLE 497

EC RETRIEVES CRASH REPORT FOR CRASH HANDLER TABLE FOR ANALYSIS 499

IHS IN OPERATION 490

NO

CRASH DETECTED? 485

OS BOOTED 480

INITIATE RUNTIME CRASH HANDLER 475

NO

CRASH DETECTED? 470

SMM CONFIGURES HARDWARE FOR OPERATION BY OS 465

YES

YES

YES

YES

CRASH HANDLING IN A HETEROGENEOUS COMPUTING PLATFORM

FIELD

This disclosure relates generally to Information Handling Systems (IHSs), and more specifically, to systems and methods for crash handling by IHSs.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS may exit normal operations when one or more software applications running on the IHS stop functioning properly. The resulting "crash" of the IHS may temporarily disable the IHS in a variety of manners. In many instances, crashes result in restarting of an IHS. For many IHSs, operations by the user during the subsequent restart (e.g., a user forcing a restart by pressing a power button of the IHS for more than a predefined duration) may cause further crashing of the applications that are running of the IHS, in particular crashing of boot applications. Crash handling by an IHS may include collection of available information describing the state of the IHS, IHS hardware and/or IHS software.

SUMMARY

In various embodiments, Information Handling Systems (IHSs) may include: an NVRAM (Non-Volatile Random-Access Memory) storing boot instructions; and one or more processors coupled to the NVRAM, wherein execution of the boot instructions by the processors causes the IHS to: initiate a boot sequence that includes two or more phases; prior to each phase of the boot sequence, initiate a crash handler configured to collect state information for IHS hardware configured during a respective phase of the boot sequence; and upon detecting a crash by the IHS, store hardware state information collected by an operative crash handler to a shared memory location.

In some embodiments, the boot sequence comprises a UEFI (Unified Extensible Firmware Interface) boot sequence. In some embodiments, a computing architecture of the one or more processors comprises x86 or ARM (Advanced RISC Machine). In some embodiments, IHS further include an embedded controller that operates from a separate power plane from the one or more processors and that has access to the shared memory location. In some embodiments, upon detecting the crash by the IHS, the embedded controller is configured to retrieve the hardware state information from the shared memory location. In some embodiments, the hardware state information collected by the operative crash handler is stored to a crash handler table at the shared memory location. In some embodiments, the hardware state information is designated in the crash handler table as collected during a phase of the boot sequence of the operative crash handler. In some embodiments, the hardware state information comprises a status of one or more hardware registers used to configure the one or more processors. In some embodiments, the hardware state information comprises a status of one or more hardware registers used to configure a storage drive of the IHS. In some embodiments, the hardware state information collected by an operative crash handler is stored to a shared portion of the NVRAM.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 is a diagram illustrating an example of a method, according to some embodiments, for crash handling by an IHS.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc., which typically include ARM core(s).

Figure 1:
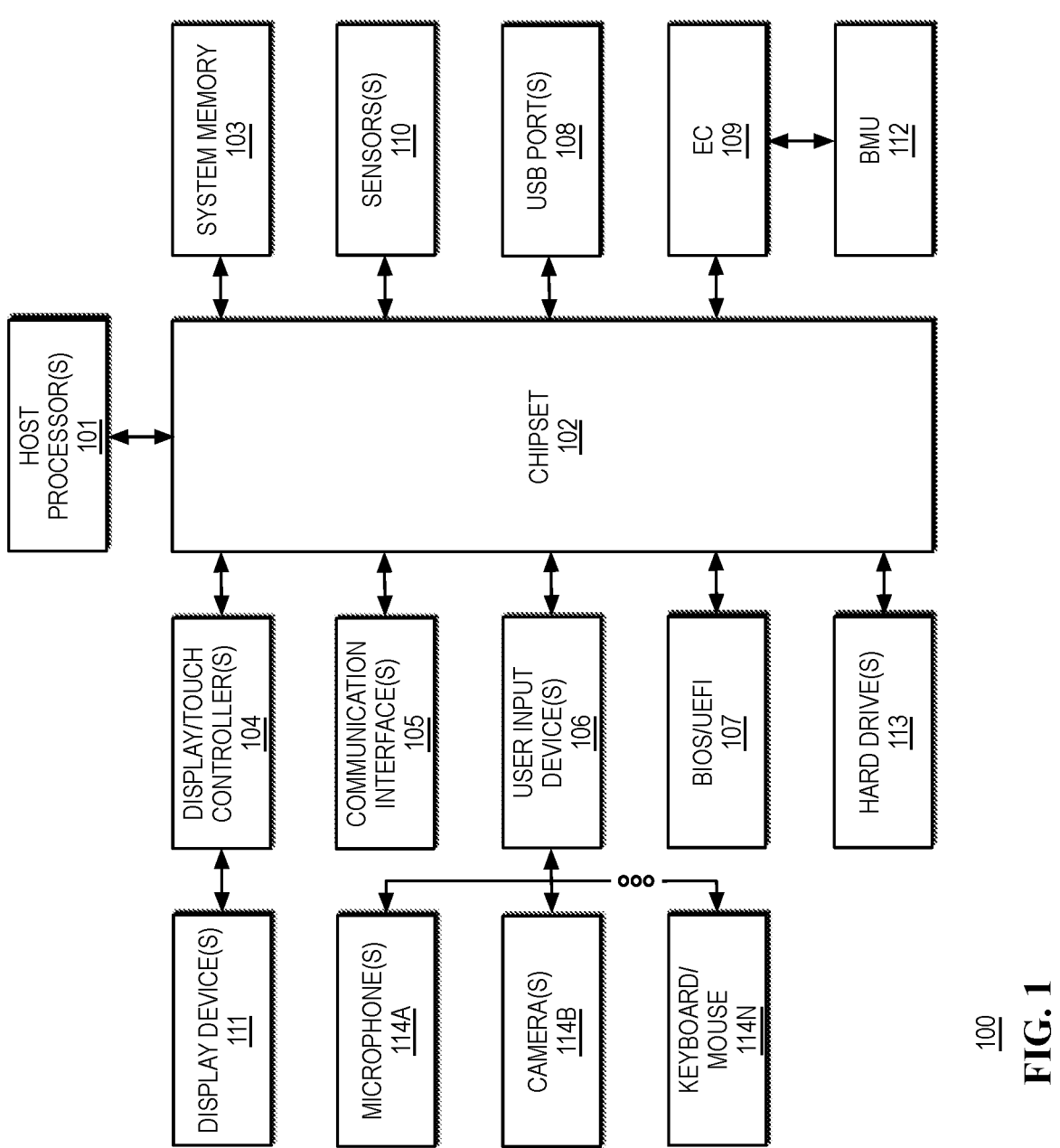
FIG. 1 is a diagram illustrating examples of components of an Information Handling System (IHS) that is configured, according to some embodiments, for crash handling by the IHS.

FIG. 1 is a block diagram of components of an IHS (Information Handling System) 100 that, in some embodiments, may include a heterogenous computing platform, as described in additional detail below, and that is configured to support crash handling by the IHS. In particular IHS 100 may be configured in embodiments to support crash handling that captures state information for hardware components of the IHS, where the crash handling is particularized to the specific phase of IHS operations during which the crash occurs, including crash handling that is particularized to each phase of booting the IHS, thus providing improved crash handling during the IHS boot sequence. The crash handling operations implemented by IHS 100 may support crash handling when booting using processors from different computing architectures.

As depicted, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as ETHERNET, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, headsets, etc.). Moreover, communication interface(s) 105 may be coupled to chipset 102 via a Peripheral Component Interconnect Express (PCIe) bus, or the like. Chipset 102 may be coupled to display and/or touchscreen controller(s) 104, which may include one or more or Graphics Processor Units (GPUs) on a graphics bus, such as an Accelerated Graphics Port (AGP) or PCIe bus. As shown, display controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be operate as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more USB ports 108, to which one or more peripheral devices may be coupled (e.g., integrated or external webcams, microphones, speakers, etc.). Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensor(s) 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), accelerometer, etc.

Basic Input/Output System (BIOS) 107 is coupled to chipset 102. Unified Extensible Firmware Interface (UEFI) was designed as a successor to BIOS, and many modern IHSs utilize UEFI in addition to or instead of a BIOS. Accordingly, as used herein, the term "BIOS" is intended to also encompass UEFI such that these terms may be used interchangeably. In operation, UEFI 107 provides an abstraction layer that allows the OS to interface with certain hardware components of the IHS 100. Upon booting of IHS 100, host processor(s) 101 may utilize program instructions of UEFI 107 to initialize and test hardware components that are coupled to IHS 100, and to load host OS 312 for use by IHS 100. Via the hardware abstraction layer provided by UEFI, software applications executed by host processor(s) 101 and/or SoCs 200 can interface with certain I/O devices that are coupled to IHS 100.

As described in additional detail below, booting of IHS 100 may be conducted according to boot sequence procedures, such as according to a UEFI boot sequence. An IHS may crash in a variety of manners during the boot sequence of an IHS 100. For instance, an IHS may crash due to software, including the operating system, exiting suddenly and ungracefully. An IHS may also crash due to operations by a user, such as forcing a hard restart of the IHS. These crashes may thus occur during normal operations of the IHS, and also at any time during booting of the IHS. As described, crash handling by an IHS 100 may include collection of available information describing the state of the IHS, IHS hardware and/or IHS software.

In embodiments, the UEFI 107 boot sequence of the IHS may support crash handling procedures that are particularized to the specific phase of the boot sequence during which the crash occurs. As described in additional detail below, the IHS 100 boot sequence may include a series of phases. As these phases of the boot sequence progress, additional hardware is initialized and additional hardware configurations are made. As such, the hardware and hardware settings that may be operational at the time of a crash changes as the boot sequence progresses. In embodiments, crash handling may be implemented as part of the boot sequence, where the crash handling is particularized at each phase to collect hardware state information that is available for collection during that particular phase. In some embodiments, the same procedures may be utilized during runtime, after the IHS has been successfully booted, where the runtime capabilities provide hardware state information for crashes occurring during operation of the host OS 312.

As described in additional detail below, in a heterogenous computing platform 200, a variety of computing architectures may be supported by an IHS. Accordingly, an IHS may be booted utilizing multiple different computing architectures, such as booting to an x86 processors 101, or instead booting to an ARM SoC, such as used to implement a heterogenous computing platform 200. Accordingly, embodiments support crash handling for different computing architectures, with the crash handling implemented at each phase particularized to the computing architecture that is being used in operating the IHS. As described in additional detail below, embodiments may further support crash handling by collected hardware state crash data and storing the crash data to a shared memory that is accessible by EC 109 that can utilize the crash data in initiating diagnostic and/or remediation procedures, or in managing re-initialization of the IHS.

Embedded Controller (EC) 109 (sometimes referred to as a Baseboard Management Controller or "BMC") includes a microcontroller unit or processing core dedicated to handling selected IHS operations not ordinarily handled by host processor(s) 101. Examples of such operations may include, but are not limited to: power sequencing, power management, receiving and processing signals from a keyboard or touchpad, as well as operating chassis buttons and/or switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing a battery charger and a battery, enabling remote management, diagnostics, and remediation over an OOB or sideband network, etc.

Unlike other devices in IHS 100, EC 109 may be operational from IHS being powered, in particular before other devices are fully running or even powered. As such, EC 109 firmware may be responsible for interfacing with a power adapter to manage the various power states that may be supported by IHS 100. Power operations of the EC 109 may also provide other components of the IHS 100 with power status information for the IHS, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

From the perspective of users, IHS 100 may appear to be either "on" or "off," without any other detectable power states. In some embodiments, however, an IHS 100 may support multiple power states that may correspond to the states defined in the Advanced Configuration and Power Interface (ACPI) specification, such as: S0, S1, S2, S3, S4, S5, and G3. For example, when an IHS 100 is operating in S0 working mode, the IHS is operational, but some hardware components that are not in use may still be individually configured in low power states. In an S0 low-power, idle mode ("Sleep" or "Modern Standby"), an IHS 100 remains partially running with various capabilities of the IHS (e.g., displays, network controllers) may be powered down and other capabilities (e.g., EC, processors) may be in low-power standby modes, thus supporting the ability of the IHS to quickly transition from to a full-power, working S0 mode in response to various events. In the past, S3 was commonly used as a default "Sleep state." However, many IHSs 100 utilize the described Modern Standby, which may be designated as a hybrid "S0ix" mode, where some or all of the internal hardware of IHS 100 may be placed into their lowest power state, while still supporting code execution that allows fast response and transition of the IHS to a working S0 mode.

An IHS 100 may additionally or alternatively support other low-power modes, such as S1-S3 (that may also be referred to as "Sleep" modes), where the IHS may appear to users to be in an off state. Some IHSs may support only one or two of these states, where the number of distinct states may be a reflection of power saving features of the IHS that have been selected for use. For instance, the amount of power consumed in states S1-S3 is less than S0 and more than S4. An S3 mode consumes less power than S2, and S2 consumes less power than S1. In states S1-S3, volatile memory may be periodically refreshed in order to maintain the operating state of the IHS, with some components remaining powered so that the IHS may wake based on inputs from a keyboard, Local Area Network (LAN), or a Universal Serial Bus (USB) device.

In the S4 state ("Hibernate"), power consumption is reduced to its lowest level. The IHS saves the contents of volatile memory to a hibernation file and some components remain powered, allowing the IHS to wake based on detected input from the keyboard, LAN, or a USB device. "Hybrid sleep" may implemented by some IHSs may use a hibernation file that is used to save the IHS's operating state, and also used to resume the IHSs operations upon reverting to a working S0 mode. "Fast startup" may refer to a power state where the user is logged off before the hibernation file is created, which allows for a smaller hibernation file in IHSs with reduced storage capabilities.

When in the S5 state ("Soft off" or "Full Shutdown"), an IHS 100 is fully shut down without a hibernation file. It occurs when a restart is requested or when an application invokes a shutdown command of the OS, EC 109, etc. During a full shutdown and re-boot, the user session is methodically de-constructed and restarted on the next boot. In some instances, a boot/startup from an S5 state takes significantly longer than resuming from S1-S4 states. At the hardware level, the main difference between S4 and S5 may be that S4 sets a flag on the storage device used to store the hibernation file and configures the bootloader to boot from the flagged hibernation file instead of booting the OS from scratch.

In a G3 ("Mechanical off") power mode, the IHS 100 may be completely turned off and consumes absolutely no power from its Power Supply Unit (PSU) or main battery (e.g., a lithium-ion battery), with the exception of any Real-Time Clock (RTC) batteries (e.g., Complementary Metal Oxide Semiconductor or "CMOS" batteries, Basic Input/Output System or "BIOS" batteries, coin cell batteries, etc.), which are used to provide power for the IHS's internal clock/calendar and for maintaining certain configuration settings. In some instances, G3 represents the lowest possible power configuration of an IHS from which the IHS can be initialized. From a G3 mode, an IHS may transition to an S5 mode in response to AC power source coupling (i.e., transitioning between battery mode to AC mode). Additionally, or alternatively, an IHS may transition from G3 to S0 based upon the detection of a power button event.

EC 109 firmware may also implement operations for detecting certain changes to the physical configuration or posture of IHS 100 (such as a laptop computer), and may also manage operations of other IHS devices based on the current physical configuration of IHS 100. For instance, when IHS 100 as a 2-in-1 laptop/tablet form factor, EC 109 may receive inputs from a lid position or hinge angle sensor 110, and may use those inputs to determine: whether the two sides of IHS 100 have been latched together to a closed position or a tablet position, the magnitude of a hinge or lid angle, etc. In response to these changes, the EC 109 may enable or disable certain features of IHS 100 (e.g., front or rear facing camera, etc.).

In this manner, EC 109 may identify any number of IHS physical postures, including, but not limited to: laptop, stand, tablet, or book. For example, when an integrated display 111 of IHS 100 is open with respect to a horizontal, face-up position of an integrated keyboard, EC 109 may determine IHS 100 to be in a laptop posture. When an integrated display 111 of IHS 100 is open with respect to a horizontal keyboard portion, but the keyboard is facing down (e.g., its keys are against the top surface of a table), EC 109 may determine IHS 100 to be in a kickstand posture. When the back of an integrated display 111 is closed against the back of the keyboard portion of an IHS, EC 109 may determine IHS 100 to be folded in a tablet posture. When IHS 100 has two integrated displays 111 that are open side-by-side (e.g., in a hybrid laptop with displays in both panels), EC 109 may determine an IHS 100 to be in a book posture. When an IHS 100 is determined to be in a book posture, EC 109 may also determine if the display(s) 111 of IHS 100 are arranged in a landscape or portrait orientation, relative to the user.

In some implementations, EC 109 may be installed as a Trusted Execution Environment (TEE) component to the motherboard of IHS 100. Accordingly, as a component with the root of trusted hardware of IHS 100, EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate a hash value based on instructions and settings loaded for use by a hardware component of IHS 100 and may compare the calculated value against the reference hash value to determine if any modifications have been made to the component, thus indicating that the component has been compromised. As such, EC 109 may validate the integrity of hardware and software components installed in IHS 100.

In some embodiments, EC 109 may provide an OOB (Out-Of-Band) or sideband channel that allows an ITDM or Original Equipment Manufacturer (OEM) to manage various settings and configurations of an IHS 100. OOB is used in contradistinction with "in-band" communication channels that operate only after networking 105 other interfaces of the IHS have been initialized, and the OS of the IHS has been successfully booted.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion" battery pack, or a nickel metal hydride or "NiMH" battery pack including one or more rechargeable batteries). Battery Management Unit (BMU) 112 may be coupled to EC 109 and it may include, for example, an Analog Front End (AFE), storage (e.g., non-volatile memory), and a microcontroller. In some cases, BMU 112 may be configured to collect and store information, and to provide that information to other IHS components, such as, for EC 109 and/or other devices within heterogeneous computing platform 200 (FIG. 2).

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), etc.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

Figure 2:
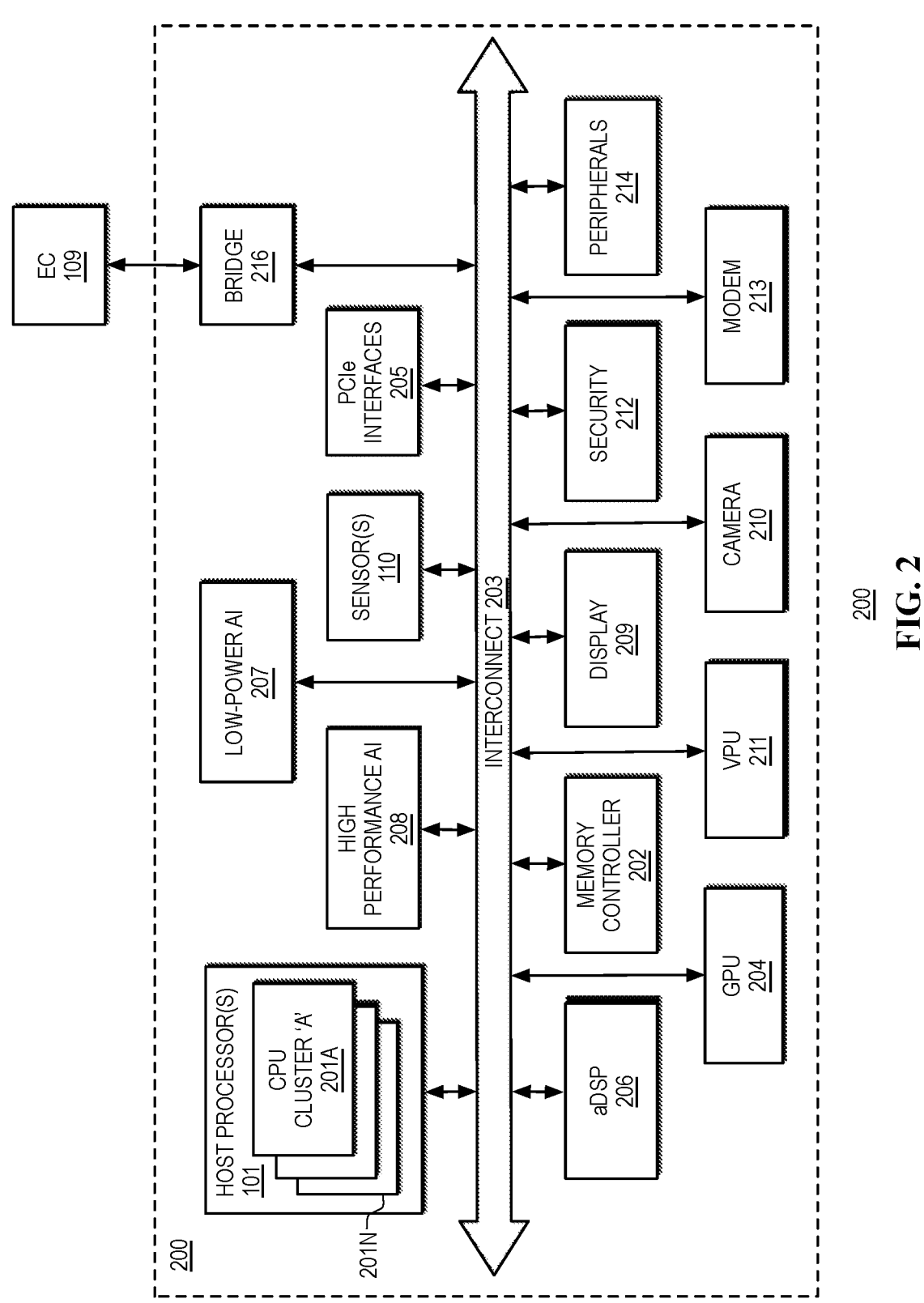
FIG. 2 is a diagram illustrating an example of a heterogenous computing platform configured, according to some embodiments, for crash handling by an IHS.

For instance, in various embodiments, host processor(s) 101 and/or other components shown in FIG. 1 (e.g., chipset 102, display controller(s) 104, communication interface(s) 105, EC 109, etc.) may be replaced by devices within heterogenous computing platform 200 (FIG. 2). As such, IHS 100 may assume different form factors including, but not limited to: servers, workstations, desktops, laptops, appliances, video game consoles, tablets, smartphones, etc.

Historically, IHSs with desktop and laptop form factors have had conventional host OSs executed on INTEL or AMD's "x86"-type processors. Other types of processors, such as ARM processors, have been used in smartphones and tablet devices, which typically run thinner, simpler, and/or mobile OSs (e.g., ANDROID, IOS, WINDOWS MOBILE, etc.). More recently, however, IHS manufacturers have started producing fully-fledged desktop and laptop IHSs equipped with ARM-based, heterogeneous computing platforms. Accordingly, host OSs (e.g., WINDOWS on ARM) have been developed to provide users with a familiar OS experience on those platforms.

FIG. 2 is a diagram illustrating an example of heterogenous computing platform 200 configured for crash handling by an IHS 100 in which the heterogenous computing platform is installed. In various embodiments, heterogenous computing platform 200 may be implemented in one or more SoCs, FPGAs, ASICs, or the like. Heterogenous computing platform 200 may include one or more discrete and/or segregated devices or components, each having a different set of processing capabilities suitable for handling a particular type of computational task. When each device in platform 200 is tasked with executing only the types of computational tasks that it is specifically designed to execute, the overall power consumption of heterogenous computing platform 200 is minimized.

In various implementations, some of the devices in heterogenous computing platform 200 may include their own microcontroller(s) or core(s) (e.g., ARM core(s)) and corresponding firmware. In some cases, a device in platform 200 may also include its own hardware-embedded accelerator (e.g., a secondary or co-processing core coupled to a main core). Each device in heterogenous computing platform 200 may be accessible through a respective Application Programming Interface (API). Additionally, or alternatively, some devices in heterogenous computing platform 200 may execute their own OS. Additionally, or alternatively, one or more of the devices of heterogenous computing platform 200 may be virtual devices and may thus operate virtual machines.

In the embodiment illustrated in FIG. 2, heterogenous computing platform 200 includes CPU clusters 201A-N that may correspond to system processor(s) 101, and that are intended to perform general-purpose computing operations. Each of CPU clusters 201A-N may include one or more processing cores and cache memories. In operation, CPU clusters 201A-N are available and accessible to the IHS's host OS 300 (e.g., WINDOWS on ARM) and other applications executed by IHS 100.

CPU clusters 201A-N may be coupled to memory controller 202 via internal interconnect fabric 203. Memory controller 202 may be responsible for managing system memory access for all of devices connected to internal interconnect fabric 203, which may include any communication bus suitable for inter-device communications within an SoC (e.g., Advanced Microcontroller Bus Architecture or "AMBA," QuickPath Interconnect or "QPI," HyperTransport or "HT," etc.). All devices coupled to internal interconnect fabric 203 may communicate with each other and with a host OS executed by CPU clusters 201A-N. In some cases, devices 209-211 may be coupled to internal interconnect fabric 203 via a secondary interconnect fabric (not shown). A secondary interconnect fabric may include any bus suitable for inter-device and/or inter-bus communications within an SoC.

A GPU 204 of the heterogenous computing platform 200 produces graphical or visual content and communicates that content to a monitor or display of the IHS 100 for rendering. In some embodiments, display engine 209 may be designed to perform additional video enhancement operations. In operation, display engine 209 may implement procedures for provide the output of GPU 204 as a video signal to one or more external displays coupled to IHS 100 (e.g., display device(s) 111). PCIe interfaces 205 provide an entry point into any additional devices external to heterogenous computing platform 200 that have a respective PCIe interface (e.g., graphics cards, USB controllers, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc. In operation, input and/or output audio streams may pass through and be processed by aDSP 206, which can send the processed audio to other devices on internal interconnect fabric 203 (e.g., CPU clusters 201A-N). In some embodiments, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.).

Camera device 210 includes an Image Signal Processor (ISP) configured to receive and process video frames captured by a camera coupled to heterogenous computing platform 200 (e.g., in the visible and/or infrared spectrum). Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

Sensor hub 207 may include AI capabilities designed to consolidate information received from other devices in heterogenous computing platform 200, process context and/or telemetry data streams, and provide that information to: (i) a host OS, (ii) other applications, and/or (iii) other devices in platform 200. In collecting data, sensor hub 207 may include General-Purpose Input/Output (GPIOs) that provide Inter-Integrated Circuit (I²C), Improved I²C (I³C), Serial Peripheral Interface (SPI), Enhanced SPI (eSPI), and/or serial interfaces to receive data from sensors (e.g., sensors 110, camera 210, peripherals 214, etc.). Sensor hub 207 may include a low-power core configured to execute small neural networks and specific applications, such as contextual awareness and other enhancements.

High-performance AI device 208 is a significantly more powerful processing device than sensor hub 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks. Using such capabilities, one or more devices of heterogeneous computing platform 200 (e.g., GPU 204, aDSP 206, sensor hub 207, high-performance AI device 208, VPU 211, etc.) may be configured to execute one or more AI model(s), simulation(s), and/or inference(s).

Security device 212 may include one or more specialized security components, such as a dedicated security processor, a Trusted Platform Module (TPM), a TRUSTZONE device, a PLUTON processor, or the like. In various implementations, security device 212 may be used to perform cryptography operations (e.g., generation of key pairs, validation of digital certificates, etc.) and/or it may serve as a hardware root-of-trust (RoT) for heterogenous computing platform 200 and/or IHS 100.

Modem/wireless controller 213 may be designed to enable wired and wireless communications in any suitable frequency band (e.g., BLUETOOTH or "BT," WiFi, CDMA, 5G, satellite, etc.), subject to AI-powered optimizations/customizations for improved speeds, reliability, and/or coverage. Peripherals 214 may include any device coupled to heterogenous computing platform 200 (e.g., sensors 110) through mechanisms other than PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100, where configuration of such hardware may be via modifications to UEFI variables corresponding to a respective hardware component.

In some implementations, EC 109 may be integrated into heterogenous computing platform 200 of IHS 100. In other implementations EC 109 may be external to the heterogenous computing platform 200 (i.e., the EC 109 residing in its own semiconductor package) but coupled to integrated bridge 216 via an interface (e.g., enhanced SPI or "eSPI"), thus supporting the EC's ability to access the SoC's internal interconnect fabric 203, including sensor hub 207 and sensor(s) 110. Through this connectivity supported by the interconnect fabric 203, EC 109 may directly access and/or operate most or all of devices 201-216, 110 of the heterogenous computing platform 200.

Figure 3:
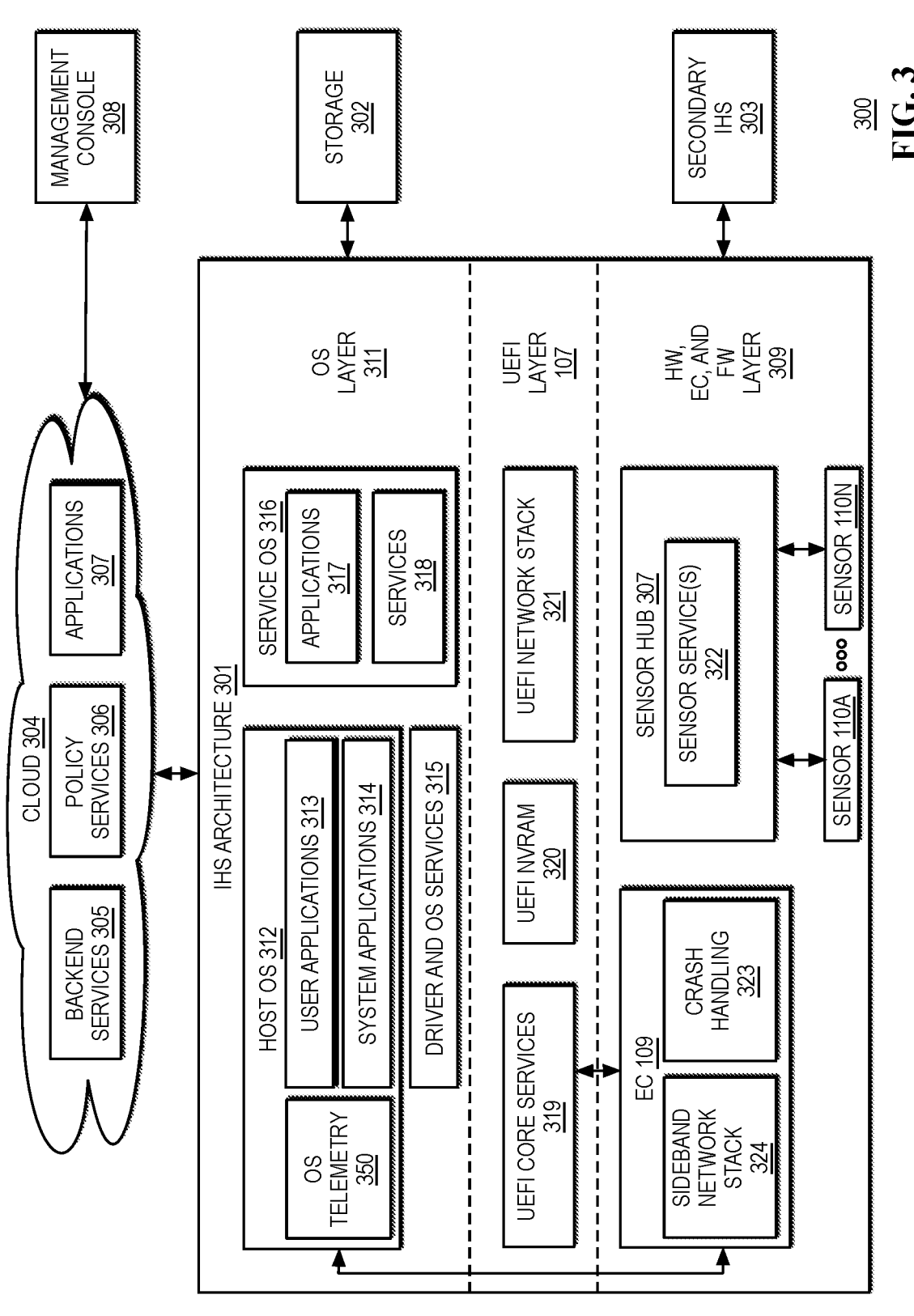
FIG. 3 is a diagram illustrating an example of a system, according to some embodiments, for crash handling by an IHS.

FIG. 3 is a diagram illustrating an example of architecture 300 for crash handling by an IHS 100 that operates a heterogenous computing platform 200, in particular for crash handling procedures that are particularized to the different phases of the operation of the IHS 100, including the different phases of the IHS boot sequence. As illustrated, architecture 300 includes IHS 301 (e.g., implementing aspects of IHS 100 and/or platform 200) coupled to storage device 302 (e.g., NVMe, SSD, etc.), secondary or companion IHS 303 (e.g., a smart phone, a laptop, etc.), and cloud 304. Cloud 304 may include backend or remote services 305, policy services 306, and web applications 307. In some cases, components of cloud 304 may be accessible to IHS 301 and/or secondary IHS 303, and configurable via ITDM management console 308. IHS architecture 301 may include hardware/EC/firmware layer 309, UEFI layer 107, and OS layer 311.

OS layer 311 includes a host OS (Operating System) 312 that is executed by host processor(s) 101. A variety of software applications may operate within the OS 312, where these applications may include user applications 313 and system applications 314, one or more OS telemetry applications 350. OS layer 311 may also include various drivers and other core OS operations, such as the operation of a kernel. As described, various components of a heterogenous computing platform 200 may independently run their own operating systems, such as an OS run by an SoC. Within IHS architecture 301, some of these discrete operating systems operating on individual components of the heterogenous computing platform 200 may be considered service OSs 316, where each service OS may each include its own applications 317 and services 318.

UEFI layer 107 may include UEFI core services 319, UEFI NVRAM 320, and UEFI network stack 321. UEFI core services 319 may include operations for identifying and validating the detected hardware components of an IHS. The UEFI network stack 321 may be utilized during initialization of the IHS in support of validation procedures, such as in retrieving reference signatures corresponding to authentic firmware instructions for hardware components of an IHS 100. UEFI core service 319 may also include operations for interfacing with certain hardware of an IHS, in particular user I/O hardware devices 350. As described in additional detail below, UEFI core services 319 may also include instructions for booting IHS 100. In some embodiments, the UEFI core services 319 may also include boot code instructions for phase-specific crash handling the UEFI boot process.

As described in additional detail below, UEFI core services 319 may include boot instructions that provide multiple crash handlers the are particularized to each phase of the boot sequence, and in some instances also during runtime of the IHS. The crash data collected in embodiments may be stored to a designated location in NVRAM 320 and/or to a shared portion of IHS system memory 103. Portions of NVRAM 320 may be utilized to store core UEFI instructions and to store variables that are used to set UEFI boot and runtime variables that may be used to configure settings of individual hardware components of an IHS 100, such as configurable firmware operations of hardware components. As described in additional detail below, another partition of UEFI NVRAM 320 may be designated for use in storing a crash handling table 535 that is populated by a UEFI crash handler module 530 that supports phase-specific crash handling during the booting of IHS 100.

As illustrated, IHS architecture 301 also includes a hardware/EC/firmware layer 309 that includes EC 109 and sensor hub 207. As described above, EC 109 may implement a variety of procedures for management of individual hardware of an IHS 100 and of the IHS itself, including management of the various power states that are supported by the IHS. EC 109 is configured to execute one or more sensor services that interface with sensor hub 207 in implementing various features of an IHS 100, such response to user-presence determination by the sensor hub 207 that is acted upon by the EC 109 in initiation heightened security protocols. As described, EC 109 may interface with some or all of the individual hardware components/systems of an IHS via sideband management channels that are separate from inline communication channels used by the host processor 101 and SoCs.

As described in additional detail below, in some embodiments, EC 109 may be configured to detect hard resets or other crashes experienced by an IHS 100. Upon detecting a crash, a crash handling module 323 of EC 109 may retrieve the crash data that has been collected and stored to the crash handling table in the UEFI NVRAM 320 by the UEFI crash handler module 530. Some crash handling module 323 embodiments may provide capabilities for offloading collected crash data from NVRAM 320 to a storage location that is accessible to diagnostic tools that may be used in documenting, investigating and/or remediating the cause of the crash.

As described above, sensor hub 207 may receive inputs from some or all of the sensors 110A-N of an IHS 100. Sensor hub 207 may implement a variety of sensor service (s) 322 for communicating with and collecting data from sensors 110A-N. In some embodiments, sensor hub 207 may implement shock detection procedures that may incorporate inputs from inertial and other sensors 110A-N of an IHS. Such shock detection procedures may detect shocks experienced by an IHS 110 and may characterize and assess detected shocks in evaluating possible damage to the IHS.

FIG. 4 is a diagram illustrating an example of a method, according to some embodiments, for crash handling by an IHS, and in particular for where the crash handling is particularized at each phase of IHS operations to collect hardware state information that is available for collection during that particular phase. Embodiments may thus begin, at 405, with the initialization of an IHS 100 that includes a heterogenous computing platform 200. Upon being powered, at 410, secured boot instructions are accessed in order to initialize a host processor 101 and to locate instructions, in some embodiments stored in UEFI NVRAM 320, for initiating a UEFI boot sequence.

Figure 5:
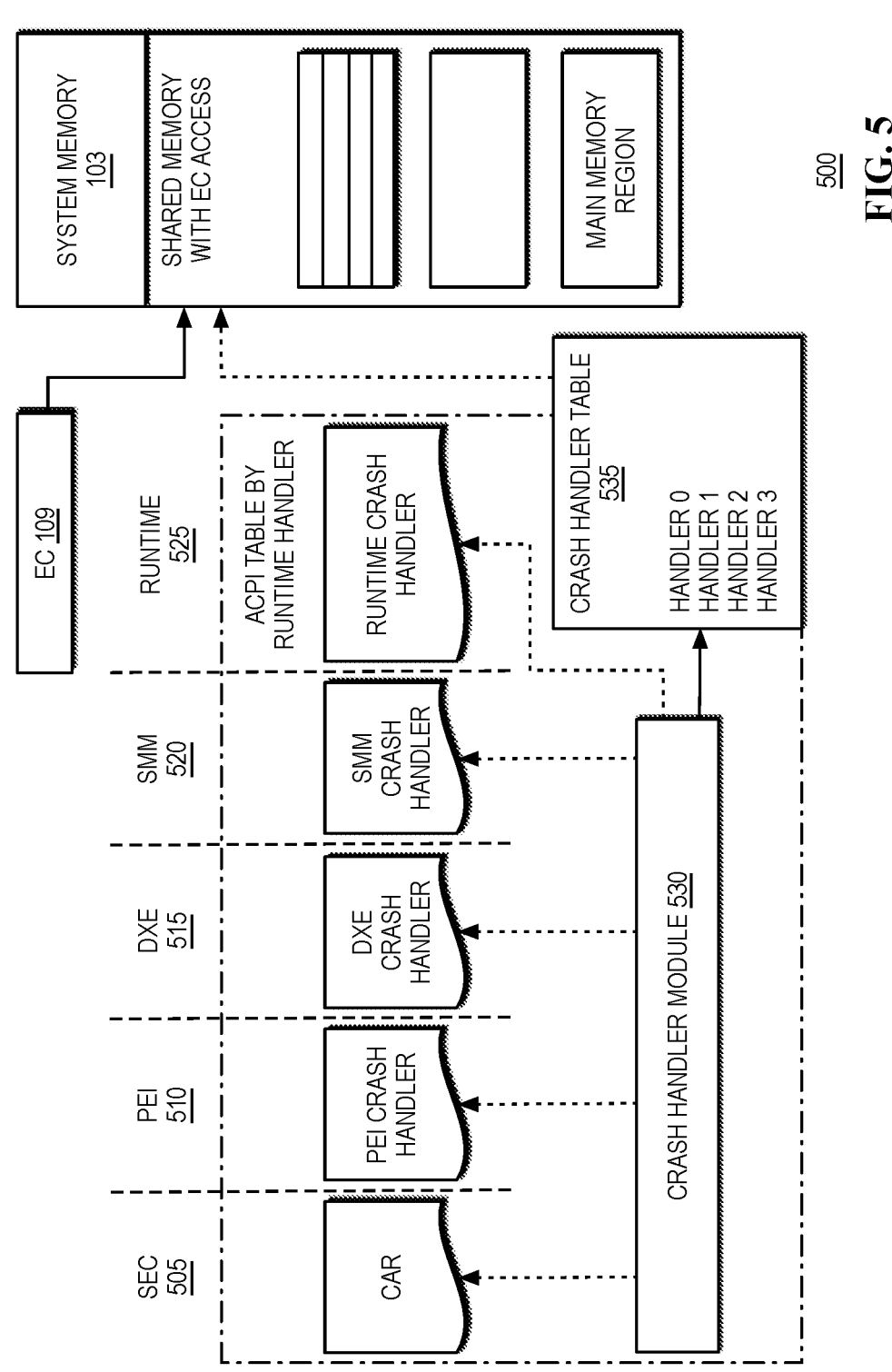
FIG. 5 is a diagram illustrating an example of an additional system, according to some embodiments, for crash handling by an IHS.

As illustrated in FIG. 5, the UEFI boot sequence may be described as a series of phases, where successful completion of one phase is generally required for the operation of subsequent phases of the boot sequence. These boot instructions of the initial phase 505 may be used to validate the authenticity of host processor(s) 101, chipset 102, and the motherboard on which the processor is mounted. As described above, a heterogenous computing platform 200 may utilize computing architectures (e.g., ARM) that are different from the that of the main CPU (e.g., x86) 101 of the 100 IHS. In addition, the main CPU 101 may be provided by different manufacturers such that different processor crash data is available depending on the manufacturer of the CPU and depending on the computing architecture of the CPU.

In light of the different hardware architectures that may be supported by an IHS 100, different crash data may be available depending on the architecture of the processor used to boot the IHS. During booting, these differences may vary depending on the phase of the boot sequence. For instance, during the initial phase 505 of the boot sequence (sometimes referred to as the SEC phase), at 420, some processors may support configurations of the use of onboard cache memories of a processor to be used as system memory (i.e., CAR, Cache as RAM) in order to facilitate faster booting of the IHS. Different processors may support different CAR settings, such as the number and size of cache memory banks that are available for use as system memory.

Different processor architectures may offering differing support for various other configurations, such as different security modes and cryptographic settings, during this initial booting phase. For crashes during this phase of the boot sequence, different crash data may be available depending the computing architecture in use. Accordingly, embodiments may implement a crash handler that is particularized to operation during this phase of the boot sequence, and that is adapted to obtain available hardware state information for the architecture of the processor that is being used to boot the IHS, such as state information regarding CAR settings in use. Through capture of state information for CAR settings, the operational crash handler may capture information that may be used to diagnose a faulty memory bank in an onboard cache of the processor that is being used in a CAR configuration, but use of that memory bank is leading to a boot failure such that use of CAR should be disabled.

In order to monitor and capture such hardware state information during this portion of the boot sequence, at 425, embodiments may initiate a PEI crash handler. In some embodiments, the PEI crash handler may operate as a UEFI firmware application that monitors for all known indications of a detected crash. As described, a crash may be caused by faults or errors in the operation of software operating on the IHS and/or may be caused by a user operation, such as a user overriding operations of the IHS and initiating a hard reset by pressing the power button of the IHS for a predefined interval. During this phase of the boot sequence, only a small portion of the software of the IHS may be operational, but a variety of hardware and/or software faults could nonetheless cause the IHS to crash. In addition, a user may force a reset of the IHS while the IHS is already attempting to reboot.

Accordingly, the PEI crash handler may receive an indication of a crash from a variety of sources. As described above, EC 109 may monitor button presses and other conditions indicating a forced reset from the user. In some embodiments, a crash handler module 530 of UEFI 107 may receive notifications of forced restarts detected by the EC 109. The PEI crash handler may additionally or alternatively receive notifications of crashes detected by UEFI 107 boot code in response to an initialization failure, such as a POST error message. In some embodiments, the PEI crash handler may detect the crash directly thorough monitoring of the status of specific hardware registers of the processor being used to boot the IHS.

Once the PEI crash handler has been activated, at 430, the UEFI boot sequence enters the PEI (Pre-EFI Initialization) phase 510. During this phase 510, initialization of authenticated host processor(s) 101, chipset 102 and the motherboard is completed, along with the initialization of system memory 103. As described, CAR operations may utilize processor-specific capabilities for use of cache memory during the boot sequence. Based on operations during the PEI phase 510, these configurations using processor cache memories may be undone and other processor-specific settings may be enabled, such as settings for use of available system memory 103, which has not been initialized, and such as setting for use of features supported by the chipset 102. As such, the state of the processor may change throughout the duration of the PEI phase 510, with different processor settings available based on the architecture of the processor that is being initialized.

Throughout this phase 510 of the boot sequence, the PEI crash handler monitors for indications of a crash. In scenarios where a crash is detected during this phase of the boot sequence, the PEI crash handler responds, at 495, by collecting crash data that provides state information for the hardware components that are operational at the time of the crash. In some embodiments, the PEI crash handler may query the status of specific hardware registers supported by the processor being booted, where the hardware registers that are queried may be limited to those that may have been set during the PEI phase 510 of the boot sequence, and thus without querying hardware registers that are configured in later phases of the boot sequence. In some embodiments, the PEI crash handler may similarly query hardware registers that are supported by the chipset 102 and/or system memory 103 and that may be configured during the PEI phase 510 of the boot sequence.

In this manner, the PEI crash handler may collect processor hardware register or other state information, as well as any another other relevant state information that is available during this phase of the boot sequence. Upon collecting the state information, at 497, the PEI crash handler may rely on a crash handler UEFI crash handler module 530 for writing the collected hardware state information to a shared memory, such as designated memory location of an UEFI NVRAM 320, and/or to a designated location in system memory 103. In some embodiments, the collected crash data may be written to a crash handler table 535 that is stored in the designated memory location. The crash handler table 535 may be used in providing a standard interface for a variety of IHS applications and system to receive crash data providing hardware state information, without knowledge of the underlying protocols or of the locations from which the crash data is retrieved, such that embodiments may provide crash handling for use with different processor architectures.

In some embodiments, EC 109 may be monitoring for crash data being written to the crash handler table 535. EC 109 may initiate such monitoring upon detecting a crash, such as described above, or upon receiving notification of a crash from the UEFI 107. Accordingly, at 499, EC 109 may detect an update to the crash handler table 535. The EC 109 may read the data that has been stored to the crash handler table 535 and may use and/or relay that data a variety of manners. In some embodiments, EC 109 may utilize the crash data directly. For instance, upon detecting repeated crashes during the boot sequence, the EC 109 may temporarily disable the hard reset response to the user pressing the power button for a predefined duration. The EC 109 may additionally utilize the crash data to initiate various diagnostic operations, where the diagnostic operations may be tailored to the current phase of the boot sequence and/or to hardware state information that has been included in the crash handler table.

As indicated in FIG. 4, in scenarios where no crash is detected during the PEI phase of the boot sequence, at 440, a DXE crash handler may then be initiated. As the boot sequence progresses, additional hardware configurations are made and additional hardware state information is thus available for capture when a crash occurs during this interval. In some embodiments, the DXE crash handler may provide a superset of the capabilities of the PEI crash handler, such that the PEI crash handler may be terminated and the DXE crash handler may be initiated in its place in order to provide crash handling that is particularized to the this next phase 515 of the boot sequence. In the same manner as the PEI crash handler, the DXE crash handler monitors for crash events. However, upon a crash being detected by the DXE crash handler, different hardware settings are queried in collecting hardware state information, with different hardware settings queried based on the architecture of the processor that is being booted.

With the DXE crash handler in operation, at 445, execution of UEFI 107 firmware enters the Driver Execution (DXE) phase 515, where images of bus and core hardware device drivers are retrieved and initialized. Upon entering the DXE phase 515 of the boot sequence, a variety of additional hardware may be initialized. User I/O hardware 106 drivers, such as a keyboard and display, may be activated. Activation of bus drivers may entail initial activation of various hardware of the IHS, and/or additional configuration of hardware settings used by the chipset and/or processors. Accordingly, a variety of different hardware may be configured during the DXE phase, with different processor architectures supporting different configurations.

Throughout this phase 515 of the boot sequence, the DXE crash handler monitors for indications of a crash. In scenarios where a crash is detected during this phase of the boot sequence, the DXE crash handler responds, at 495, by collecting crash data that provides state information for the hardware components that are operational at the time of the crash. For instance, the DXE crash handler may query the status of specific hardware registers that are configured during this phase 515 of the boot sequence. For instance, hardware registers for activated storage drives and user I/O hardware may be queried. In additional, hardware registers corresponding to bus settings used by these components and components activated during the DXE phase 515 may be required. In addition, the DXE crash handler may also include all hardware state queries supported by the PEI crash handler, since that hardware state information from that phase may also be useful in diagnosing a crash during the DXE phase.

As with the PEI crash handler, at 497, the DXE crash handler may rely on a UEFI crash handler module 530 for writing the collected hardware state information to a shared memory, such as designated NVRAM 320 memory location. In some embodiments, the collected crash data may be written to the crash handler table 535 that is stored in the designated memory location. In some embodiments, the crash handler table 535 may separately designate crash data reported by different crash handlers of the UEFI firmware environment. In such embodiments, the DXE crash handler may write collected hardware state information that is also collected by the PEI crash handler as PEI entries in the crash handler table 535 and collected hardware state information collected only during the DXE phase of the boot sequence as DXE entries in the crash handler table. In this manner, diagnostics are provided with all crash data that is collected, and the data is provided according to the phase of the boot sequence during which the crash data was collected, thus providing additional information for use in diagnosing the crash. As above, at 499, EC 109 may be monitor for crash data being written to the crash handler table 535. EC 109 may read the data stored to the crash handler table 535 and may use and/or relay that data a variety of manners, such as to initiate diagnostic operations that are tailored to the hardware state information that is included in the crash handler table.

As indicated in FIG. 4, in scenarios where no crash is detected during the DXE phase of the boot sequence, at 460, an SMM crash handler may then be initiated. As the boot sequence progresses, additional hardware configurations are made and additional hardware state information is thus available. In some embodiments, the SMM crash handler may provide a superset of the capabilities of the DXE crash handler, such that the DXE crash handler may be terminated and the SMM crash handler may be initiated in its place in order to provide crash handling that is particularized to the this next phase 520 of the boot sequence. In the same manner as the PEI crash handler and the DXE crash handler, the SMM crash handler monitors for crash events. However, upon a crash being detected by the SMM crash handler, different hardware settings are queried in collecting hardware state information, with different hardware settings queried based on the architecture of the processor that is being booted.

With the SMM crash handler in operation, at 465, execution of UEFI 107 firmware enters the System Management Mode (SMM) phase 520, where images for additional firmware drivers are retrieved and initiated. Based on the loading of these drivers, various hardware of the IHs may be initialized and may be operational, such as network controller 105, sensors 110 and storage drives 113 from which OS boot instructions will be retrieved. With core hardware and bus drivers loaded and operating, BDS (Boot Device Selection) operations may be initiated and the location of the OS boot code is identified. In some instances, memory and disk space may be allocated for booting of the host OS 312 corresponding to the identified boot code.

Throughout this phase 520 of the boot sequence, the SMM crash handler monitors for indications of a crash.

Where a crash is detected, the SMM crash handler responds, at 495, by collecting crash data that provides state information for the hardware components that are operational at the time of the crash. In particular, the SMM crash handler may query the status of specific hardware registers that are configured during this phase 520 of the boot sequence. For instance, hardware registers for activated storage drives and network hardware may be queried. In addition, the SMM crash handler may also include all hardware state queries supported by the PEI crash handler and the DXE crash handler.

As with prior crash handlers, at 497, the SMM crash handler may rely on a crash handler UEFI firmware application 530 for writing the collected hardware state information to a shared memory. As with the DXE crash handler, the SMM crash handler may store the collected data to a separately designated area of the crash handler table 535. In such embodiments, the SMM crash handler may write collected hardware state information that is also collected by the PEI crash handler as PEI entries and information also collected by the DXE crash handler as DXE entries in the crash handler table. As above, at 499, EC 109 may be monitor for crash data being written to the crash handler table 535.

As indicated in FIG. 4, in scenarios where no crash is detected during the SMM phase of the boot sequence, at 475, a runtime crash handler may then be initiated. As the boot sequence progresses, additional hardware configurations are made and additional hardware state information is thus available. Once the runtime crash handler has been initiated, at 480, the OS of the IHS may be booted. As a result, a wide variety of hardware and peripheral devices that are coupled to the IHS may be initiated. In some embodiments, the runtime crash handler may be configured to collect state information for all hardware that is coupled to IHS 100 and that is recognized by UEFI 107. In some embodiments, the runtime crash handler may provide a superset of the capabilities of the SMM crash handler, such that the SMM crash handler may be terminated and the runtime crash handler may be initiated in its place in order to provide crash handling that is particularized to the IHS being in operation, in particular with the OS booted.

In the same manner as the prior crash handlers, the runtime crash handler monitors for crash events. However, upon a crash being detected by the runtime crash handler, at 485, hardware settings are queried in collecting hardware state information for all hardware that is operational during operation of the host OS 312. As before, at 497, the runtime crash handler may rely on a crash handler UEFI firmware application 530 for writing the collected hardware state information to a shared memory. As before, the runtime crash handler may store the collected data to a separately designated area of the crash handler table 535 and may store crash data that is also collected by during one of the phases of the boot sequence as entries for that phase in the crash handler table 535. As above, at 499, EC 109 may be monitor for crash data being written to the crash handler table 535.

In scenarios, where no crashes occur, at 490, the IHS remains in operation until reinitialized and the operation of embodiments as described herein is repeated. In this manner, embodiments provide crash handling that is particularized to each phase of the IHS boot cycle and to the operation of the booted IHS. Embodiments may thus provide improved diagnostic crash data that is particularized to each of the phases of the IHS boot sequence, and may do so using minimal resources during the boot sequence. Through the operation of embodiments, crash handling is also supported for different processor and hardware architectures.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
an NVRAM (Non-Volatile Random-Access Memory) storing boot instructions; and
one or more processors coupled to the NVRAM, wherein execution of the boot instructions by the processors causes the IHS to:
   initiate a boot sequence that includes two or more phases;
   prior to each phase of the boot sequence, initiate a crash handler configured to collect state information for IHS hardware configured during a respective phase of the boot sequence; and
   upon detecting a crash by the IHS occurring during one phase of the boot sequence, store hardware state information and information identifying the one phase of the boot sequence corresponding to the occurrence of the crash collected by an operative crash handler to a shared memory location.

2. The IHS of claim 1, wherein the boot sequence comprises a UEFI (Unified Extensible Firmware Interface) boot sequence.

3. The IHS of claim 1, wherein a computing architecture of the one or more processors comprises x86 or ARM (Advanced RISC Machine).

4. The IHS of claim 1, further comprising an embedded controller that operates from a separate power plane from the one or more processors and that has access to the shared memory location.

5. The IHS of claim 4, wherein upon detecting the crash by the IHS, the embedded controller is configured to retrieve the hardware state information from the shared memory location.

6. The IHS of claim 1, wherein the hardware state information collected by the operative crash handler is stored to a crash handler table at the shared memory location.

7. The IHS of claim 6, wherein the hardware state information is designated in the crash handler table as collected during a phase of the boot sequence of the operative crash handler.

8. The IHS of claim 1, wherein the hardware state information comprises a status of one or more hardware registers used to configure the one or more processors.

9. The IHS of claim 1, wherein the hardware state information comprises a status of one or more hardware registers used to configure a storage drive of the IHS.

10. The IHS of claim 1, wherein the hardware state information collected by an operative crash handler is stored to a shared portion of the NVRAM.

11. A method for crash handling by an Information Handling System (IHS), the method comprising:
   initiating a boot sequence that includes two or more phases;
   prior to each phase of the boot sequence, initiating a crash handler configured to collect state information for IHS hardware configured during a respective phase of the boot sequence; and
   upon detecting a crash by the IHS occurring during one phase of the boot sequence, storing hardware state information and information identifying the one phase of the boot sequence corresponding to the occurrence of the crash collected by an operative crash handler to a shared memory location.

12. The method of claim 11, wherein the boot sequence comprises a UEFI boot sequence.

13. The method of claim 11, wherein the hardware state information collected by the operative crash handler is stored to a crash handler table at the shared memory location.

14. The method of claim 11, wherein the hardware state information comprises a status of one or more hardware registers used to configure one or more processors of the IHS.

15. The method of claim 14, wherein a computing architecture of the one or more processors comprises x86 or ARM (Advanced RISC Machine).

16. An NVRAM (Non-Volatile Random-Access Memory) storage device having instructions stored thereon, wherein execution of the instructions by one or more processors of an IHS (Information Handling System) causes the processor to:
   initiate a boot sequence that includes two or more phases;
   prior to each phase of the boot sequence, initiate a crash handler configured to collect state information for IHS hardware configured during a respective phase of the boot sequence; and
   upon detecting a crash by the IHS occurring during one phase of the boot sequence, store hardware state information and information identifying the one phase of the boot sequence corresponding to the occurrence of the crash collected by an operative crash handler to a shared memory location.

17. The NVRAM storage device of claim 16, wherein the boot sequence comprises a UEFI boot sequence.

18. The NVRAM storage device of claim 16, wherein the hardware state information collected by an operative crash handler is stored to a shared portion of the NVRAM.

19. The NVRAM storage device of claim 18, wherein the hardware state information collected by the operative crash handler is stored to a crash handler table at the shared memory location.

20. The NVRAM storage device of claim 16, wherein the hardware state information comprises a status of one or more hardware registers used to configure the one or more processors.

\* \* \* \* \*